(12) United States Patent
Girondi

(10) Patent No.: US 9,511,662 B2
(45) Date of Patent: Dec. 6, 2016

(54) MOTOR VEHICLE

(71) Applicant: UFI FILTERS S.P.A., Porto Mantovano (IT)

(72) Inventor: Giorgio Girondi, Mantova (IT)

(73) Assignee: UFI FILTERS S.P.A., Porto Mantovano (IT)

( * ) Notice: Subject to any disclaimer, the term of this patent is extended or adjusted under 35 U.S.C. 154(b) by 0 days.

(21) Appl. No.: 14/782,026

(22) PCT Filed: Feb. 25, 2014

(86) PCT No.: PCT/IB2014/000231
§ 371 (c)(1),
(2) Date: Oct. 2, 2015

(87) PCT Pub. No.: WO2014/162179
PCT Pub. Date: Oct. 9, 2014

(65) Prior Publication Data
US 2016/0059689 A1 Mar. 3, 2016

(30) Foreign Application Priority Data

Apr. 3, 2013 (IT) ............... RE2013A0024

(51) Int. Cl.
| | |
|---|---|
| *B60K 13/02* | (2006.01) |
| *F02M 35/16* | (2006.01) |
| *F02M 35/024* | (2006.01) |
| *B62D 25/08* | (2006.01) |
| *F02M 35/02* | (2006.01) |

(52) U.S. Cl.
CPC ............. *B60K 13/02* (2013.01); *B62D 25/085* (2013.01); *F02M 35/0205* (2013.01); *F02M 35/02416* (2013.01); *F02M 35/161* (2013.01); *F02M 35/0215* (2013.01); *F02M 35/02483* (2013.01)

(58) Field of Classification Search
None
See application file for complete search history.

(56) References Cited

U.S. PATENT DOCUMENTS

| | | | |
|---|---|---|---|
| 5,148,786 A * | 9/1992 | Matsumura | B60K 13/02 123/198 E |
| 5,769,045 A | 6/1998 | Edwards et al. | |
| 2003/0188902 A1 * | 10/2003 | Decuir | B60K 13/02 180/68.3 |
| 2008/0041328 A1 | 2/2008 | Granatelli | |

FOREIGN PATENT DOCUMENTS

| | | |
|---|---|---|
| DE | 102005019672 A1 | 11/2006 |
| EP | 1745968 A2 | 1/2007 |
| EP | 1995103 A1 | 11/2008 |

* cited by examiner

*Primary Examiner* — John Walters
*Assistant Examiner* — Hilary L Johns
(74) *Attorney, Agent, or Firm* — Browdy and Neimark, P.L.L.C.

(57) ABSTRACT

An embodiment of the present invention relates to a vehicle (100) comprising a body (105), an internal combustion engine (140) and a filter cartridge (180) able to filter the aspirated comburent air in arrival in the internal combustion engine (140), the filter cartridge (180) being contained internally of the body (105) and located in a position in which the plan volume of the filter cartridge (180) is completely external of the plan volume of the internal combustion engine (140).

10 Claims, 5 Drawing Sheets

MOTOR VEHICLE

The present invention relates to the layout of a motor vehicle, and in particular the layout of a motor vehicle such as for example a motor car, a van or a lorry.

As is known, motor vehicles generally comprise a body, i.e. an assembly of structural components and/or upholstery which define the external surface of the motor vehicle, internally of which are delimited the drive cabin and a multiplicity of spaces in which various functional devices and organs can be installed.

In particular, the front part of the body generally delimits a large engine component which contains the internal combustion engine for propelling the vehicle, together with many other devices belonging to auxiliary systems necessary for the functioning of the engine, for example the lubricating system, cooling system, the discharge system of the combustion gases, as well as the aspirating system of the comburent air.

The internal combustion engine and the relative accessory devices are generally closed internally of the engine compartment of the body by a large openable bonnet, which defines, in practice, the upper portion of the front body zone of the motor vehicle.

To increase the aerodynamic quality of the motor vehicle and thus reduce consumption and polluting emissions of the internal combustion engine, the present tendency of car constructors is to realise a bonnet that is lower, with respect to the ground, and as far as possible raked.

A very significant limitation of this type of approach is however represented by the size and arrangement of the engine and the various accessory devices internally of the underlying engine compartment.

For example, motor vehicles are known in which the engine is surmounted and covered by an aesthetically-appealing plastic cover, which exhibits a seating that can house the filter cartridge of the aspirating system of the comburent air.

As the filter cartridge exhibits a not-insignificant volume, it follows that this arrangement considerably increases the overall height of the internal combustion engine, and therefore requires a depth of the engine compartment which is relatively large and consequently introduces a very important constraint to the shape, the inclination and the minimum distance of the upper bonnet with respect to the ground.

An aim of the present invention is to obviate or at least significantly reduce this drawback in the prior art, with a solution that is simple, rational and relatively inexpensive.

This and other aims are attained by the characteristics of the invention as set down in independent claim 1. The dependent claims delineate preferred and/or particularly advantageous aspects of the invention.

In particular, an embodiment of the present invention makes available a vehicle comprising a body, an internal combustion engine and a filter cartridge which can filter the comburent air in aspiration to the internal combustion engine, in which the filter cartridge is contained internally of the body and is located in a position in which the plan volume of the filter cartridge is completely external of the plan volume of the internal combustion engine.

By the expression "plan volume" is meant, in general terms, the external profile of the filter cartridge and the internal combustion engine, as can be seen from a view of the vehicle from above.

In practice, the fact that the plan volumes of the filter cartridge and the internal combustion engine are completely external of one another simply means that these two components are not superposed on one another in a vertical direction, not even partially.

In this way, it is advantageously possible to reduce the depth of the engine compartment, consequently enabling a greater design freedom in the selection of the shapes, the inclination and the height from the ground of the front part of the body.

In an aspect of the present invention, the filter cartridge can be located adjacent to a portion of the body which perimetrally delimits the engine compartment.

By the term "adjacent" is generally mean that between the filter cartridge and the portion of the body no other functional devices of the vehicle are interposed.

Thanks to this solution, the position of the filter cartridge is very peripheral, enabling a freeing-up of space at the centre of the engine compartment so that other accessory devices can be effectively housed.

In a further aspect of the invention, the plan volume of the filter cartridge can be at least partially external with respect to the plan volume of the bonnet which superiorly closes the engine compartment.

In practice, in some embodiments the bonnet of the vehicle can be slightly smaller in plan view of the underlying engine compartment, leaving, in general terms, niches, for example at the flanks of the vehicles, which are surmounted by a relatively narrow but fixed portion of the body.

In these embodiments, the filter cartridge can be located at least partially internally of one of these lateral niches of the engine compartment, so that the plan volume thereof is external with respect to the plan volume of the openable bonnet.

With this solution, the filter cartridge is not completely surmounted by the bonnet, which can therefore be profiled or positioned more appropriately and with fewer structural constraints.

In greater detail, in a preferred aspect of the invention the filter cartridge can be located vertically above a wheel well of the vehicle.

A wheel well is a portion of the body, generally arched, which surmounts and covers one of the vehicle wheels, and therefore functions as a mudguard.

With this solution, the filter cartridge is located internally of the body in a particularly peripheral and usually little-used position, in which the filter cartridge constitutes no particular constraints to the shape and dimensions of the bonnet, and more in general of the entire front part of the vehicle body.

In a further aspect of the invention, the filter cartridge can be directly engaged to a portion of the body, such as for example to the wheel well.

In this way, the mounting of the filter cartridge can be rather simple and economical.

The engagement can be obtained with releasable means, for example using a snap-engaging system, such as to enable replacement of the filter cartridge.

In a further aspect of the invention, the cartridge can be housed internally of a containing chamber provided with an inlet for the air to be filtered and an outlet of the filtered air.

This solution can be advantageous for protecting the filter cartridge from dirt and water.

In an aspect of the invention, the containing chamber can be delimited by a closed casing which is mounted internally of the body, for example directly fixed to a portion of the body or fashioned in an element direction associated to the body, for example internally of an optical group.

In this way, the realisation of the containing chamber is generally rather simple.

In a further aspect of the containing chamber might be at least partially delimited by at least a portion of the vehicle body.

For example, the containing chamber might be delimited on some sides by a portion of the vehicle body, such as for example a flank and/or the above-mentioned wheel well and/or the bonnet, and on other sides by additional plastic or metal walls which can be fixed to the portion or portions of the body.

Alternatively, the containing chamber of the filter cartridge might be completely delimited by a portion of the body, for example fashioned internally of a flank or the wheel well or the bonnet.

In this way, it is in general terms possible to reduce the overall volume of the filtration system of the comburent air.

In a further aspect of the invention, the filter cartridge can comprise at least a filter wall having a tubular shape. This solution is advantageous as the tubular filter walls enable obtaining a greater filtering capacity given a same overall volume of the cartridge.

In particular, the filter cartridge can comprise a plurality of tubular filter walls, which are configured such as to be crossed in parallel by the air to be filtered.

This solution is advantageous because the filter walls are singly smaller, and can be arranged with respect to one another in such a way as to occupy smaller spaces or in any case having a more complex shape, with respect to a single filter wall of a same overall filtering capacity.

In a further aspect of the invention, each filter wall can be configured such as to be radially crossed from outside towards inside by the air to be filtered.

In this way, the filtered air which is in the internal cavity of the filter walls can be directly conveyed internally of the engine, without any need to close the filter cartridge internally of a containing chamber or a casing of the type of the ones delineated herein above.

Further characteristics and advantages of the invention will emerge from a reading of the following description provided by way of non-limiting example, with the aid of the figures illustrated in the accompanying tables of drawings.

Figure 1:
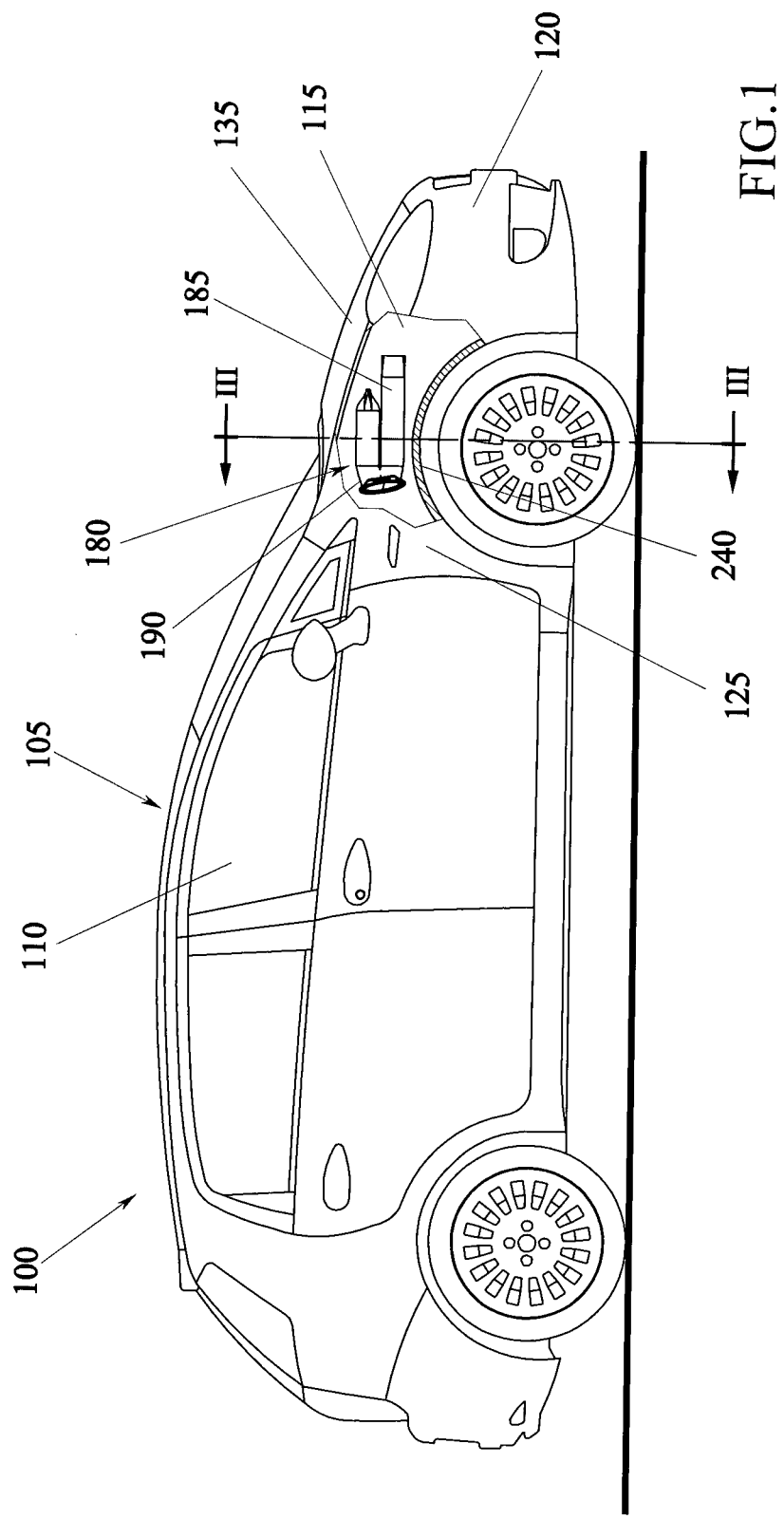
FIG. 1 is a lateral view of a motor vehicle, a front part of which is partially sectioned along plane I-I as indicated in FIG. 2.

In the above-described figures, reference numeral 100 denotes a vehicle in its entirety.

The motor vehicle 100 comprises a body 105, i.e. an assembly of structural and/or cladding elements able to define the external surfaces and therefore the exterior shape of the motor vehicle 100.

The body 105 delimits internally thereof a multiplicity of empty spaces, among which in particular various loading compartments, a cabin 110 for accommodating the driver and any passengers, as well as a spacious engine compartment 115 arranged frontally with respect to the cabin 110.

In greater detail, the engine compartment 115 is perimetrally delimited by a front grille 120, two opposite lateral flanks 125 and 130, and a dashboard (not visible) which separates it from the cabin 110. The engine compartment 115 is further superiorly closed by a bonnet 135, which can be opened to allow access to the inside.

The front grille 120, the lateral flanks 125 and 130 and the bonnet 135 are all elements defining external surfaces of the vehicle 100 and therefore which belong to the front portion of the body 105, while the dashboard is closed internally of the body 105.

Figure 2:
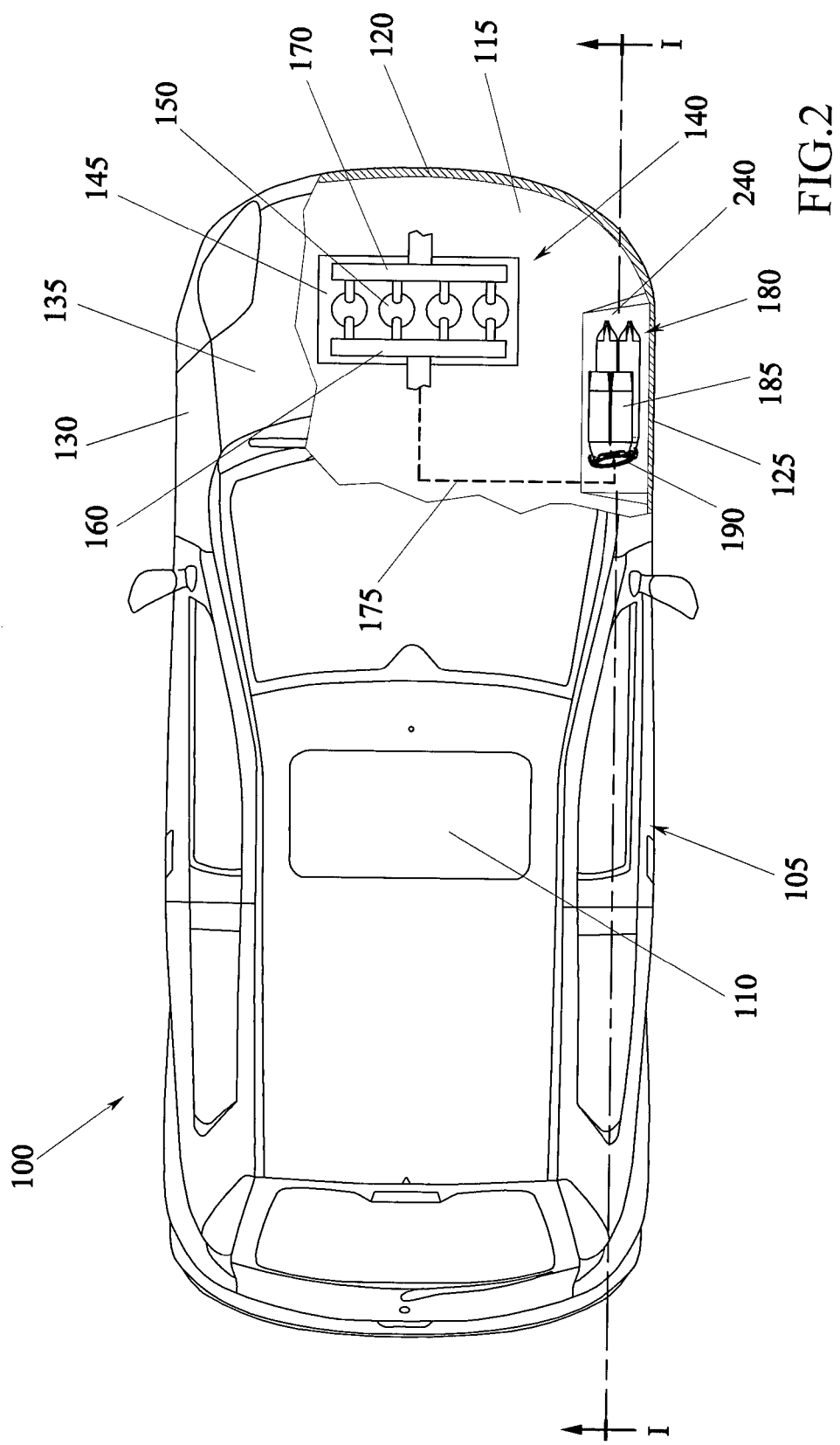
FIG. 2 is a plan view of the motor vehicle illustrated in FIG. 1, the front part of which is partially sectioned along plane II-II as indicated in FIG. 3.

As illustrated in FIG. 2, the engine compartment 115 contains an internal combustion engine 140, for example a diesel or petrol engine, able to propel the vehicle 100.

The engine 140 generally comprises an engine body 145 in which one or more cylinders 150 are fashioned, each of which houses a relative piston, which is coupled to a crank shaft which is housed in a lower block fixed below the engine body 145. A mix of air and fuel (for example diesel or petrol) is supplied internally of the cylinders 150, combustion of which produces hot gases which expand to cause alternating movement of the pistons and therefore the rotating movement of the crank shaft. The fuel can be supplied internally of each cylinder 150 by an injector (not illustrated) connected to a fuel tank by means of a pump. The comburent air can be supplied internally of each cylinder 150 via one or more aspirating holes, which are connected to an aspirating manifold 160 and are periodically opened and closed by respective aspirating valves (not illustrated). Likewise, the combustion gases are discharged from each cylinder 150 through one or more discharge holes, which are connected to a discharge manifold 170 and are periodically opened and closed by respective discharge valves (not illustrated).

Many other devices are normally housed internally of the engine compartment 115, which devices belong to auxiliary systems necessary for the functioning of the engine 140, among which for example a lubricating system, a cooling system, a treatment system for exiting combustion gases from the discharge manifold 170, as well as a system for conveying the comburent air internally of the aspirating manifold 160.

In particular, the system for conveying the comburent air generally comprises an aspirating conduit 175 (denoted schematically with a broken line in FIG. 2), which is aimed at collecting air from outside and guiding it internally of the aspirating manifold 160. The aspirating conduit 175 is intercepted by at least a filter cartridge 180, which comprises one or more filtering elements made of a porous material, which are able to filter the external air before it reaches the aspirating manifold 160, retaining the impurities that might be present therein. The filter cartridge 180 can be located at the end of the aspirating conduit 175 or alternatively at any intermediate point thereof.

In the illustrated example, the filter cartridge 180 comprises in particular a plurality of filter elements 185 and a support element 190 to which the filter elements 185 are stably fixed.

As can be seen in figures from 4 to 8, the filter elements 185 are generally conformed as cylindrical bodies, in the example as tubular cylindrical bodies each of which is closed at an end and open at the opposite end. The filter elements 185 are preferably arranged parallel to one another, reciprocally flanked, and distributed in slightly-offset superposed pairs, such as to reduce the overall volume of the filter cartridge 180 as much as possible. In general, the filter elements 185 can be realized with any porous material that is permeable to air but able to retain the solid particles in suspension. In particular, each filter element 185 can be made of a non-woven textile of polymer fibres.

The support element 190 can be conformed as a profiled shell, which can be made of a plastic material, for example by a moulding process. The profiled shell delimits an internal volume 200 which, operating as a manifold, is in communication with the internal cavity of all the filter elements 185.

In particular, the support element 190 is provided with a multiplicity of access openings communicating with the internal volume 200, among which a plurality of sleeves 205 parallel to one another and a mouth 210 afforded by the opposite side with respect to the mouths 205.

Each sleeve 205 is substantially conformed as a cylinder, on which the open end of a respective filter element 185 is coaxially fixed. In this way, each sleeve 205 is occluded by the relative filter element 185 and further functions as a support therefor. The open end of the filter element 185 can be stably fixed to the relative sleeve 205 by gluing, using a hot-welding process or with any other system which guarantees a hermetic seal of the connection. The open end of the filter element 185 might be partially inserted on or internally of the sleeve 205.

The mouth 210 can have a greater diameter than the sleeves 205 and can be inclined with respect thereto. The mouth 210 can further be delimited by a flat flange 215, which can be further provided with means for engaging the filter cartridge 180 to a support body solidly constrained to the motor vehicle 100. The engaging means can be releasable, such as to enable replacement of the filter cartridge 180, for example snap-engaging means. In the illustrated figures, the engaging means comprise, for example, a pair of flexible wings 225, which projectingly branch from the external perimeter edge of the flat flanges 215. The flexible wings 225 are identical to one another and arranged symmetrically on diametrically opposite sides of the mouth 210. Each of the flexible wings 225 further exhibits a tooth which radially projects externalwise, which is tapered towards the flat flange 215 and defines a step which can snap-engage with an abutment belonging to the body to which the filter cartridge 180 is to be engaged.

Lastly, the filter cartridge 180 can comprise a handle 235, which can be realised in a single body with the support element 190, also branching froth the external perimeter edge of the flat flange 215. The handle 235 can be gripped by an operator in order to simplify the manipulation of the filter cartridge 180 during the mounting to or demounting there-from with respect to the motor vehicle 100.

As illustrated in FIG. 2, the filter cartridge 180 is mounted internally of the engine compartment 115 and is located in a position such that the plan volume of the filter cartridge 180 (i.e. as can be seen by observing the motor vehicle 100 from above) is completely external of the plan volume of the internal combustion engine 140. In practice, the filter cartridge 180 and the internal combustion engine 140 are not superposed on one another in a vertical direction, not even partially, but are instead reciprocally offset, such as to advantageously enable reducing the depth of the engine compartment 115.

In particular, the filter cartridge 180 can be located adjacent to a portion of the body 105 which perimetrally delimits the engine compartment 115, for example in such a way that other elements or functional devices of the vehicle cannot be interposed between the filter cartridge 180 and the portion of the body 105. In the illustrated embodiment, the filter cartridge 180 is located for example internally of the engine compartment 115 adjacent to the lateral flank 125. In this way, the position of the filter cartridge 180 is very peripheral, enabling a freeing-up of space in the centre of the engine compartment 115 which can be exploited to accommodate other accessory devices.

Figure 3:
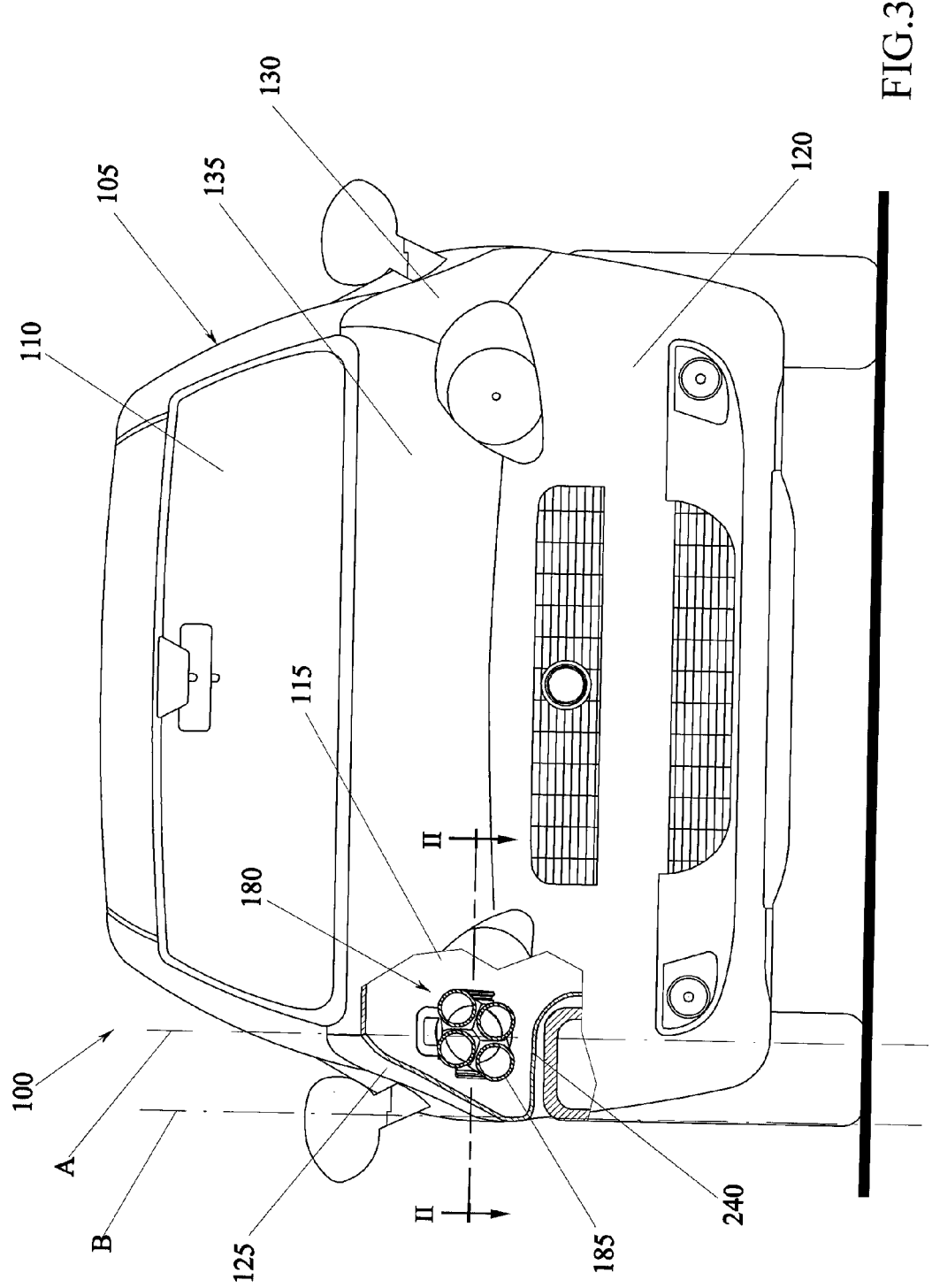
FIG. 3 is a front view of the motor vehicle illustrated in FIG. 2, partially sectioned along plane of FIG. 1.
Figure 4:
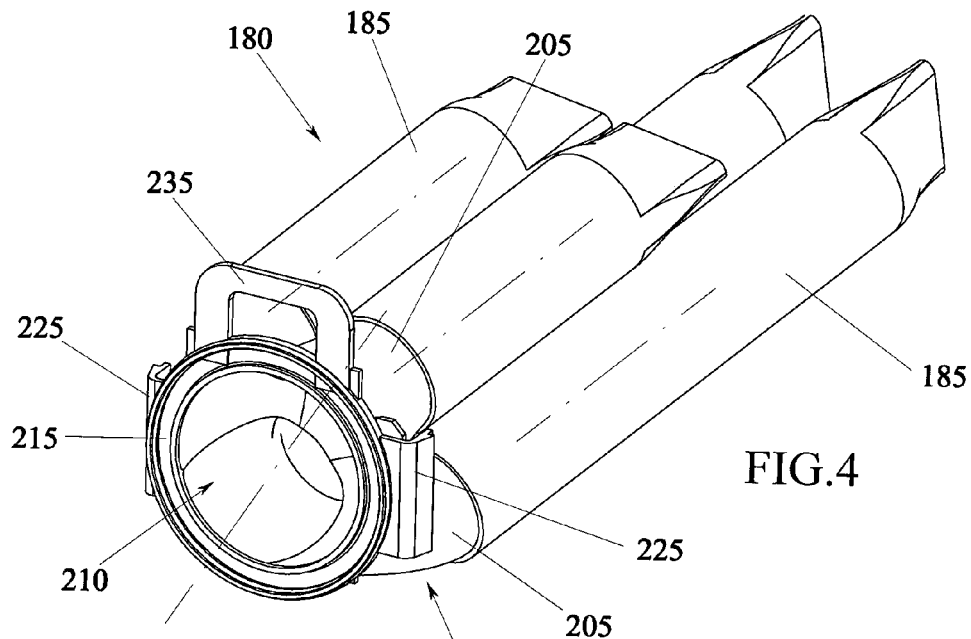
FIG. 4 is a perspective view of a filter cartridge installed on-board the motor vehicle illustrated in the preceding figures.
Figures 5, 6:
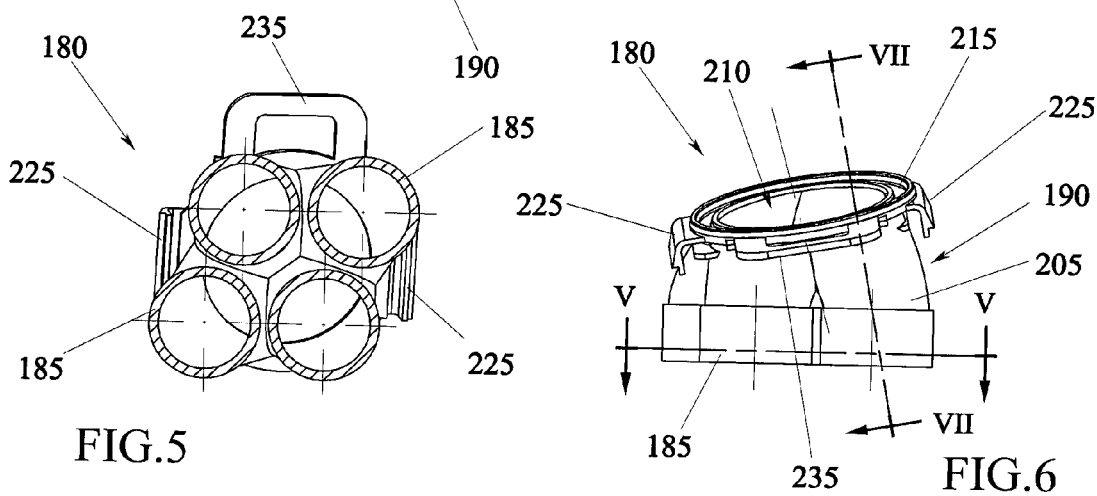
FIG. 5 is section V-V of FIG. 6.
FIG. 6 is a lateral view of a portion of the filter cartridge of FIG. 4.
Figures 7, 8:
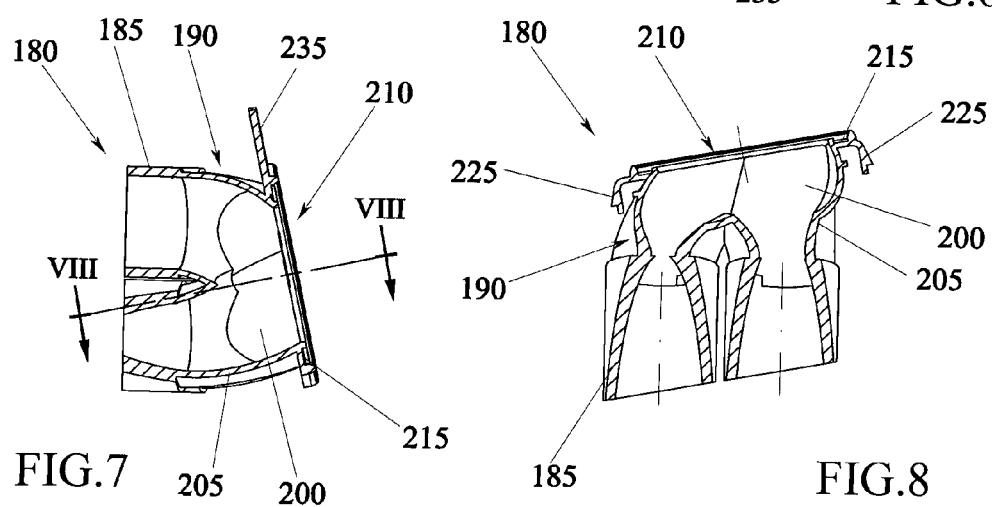
FIG. 7 is section VII-VII of FIG. 6.
FIG. 8 is section VIII-VIII of FIG. 7.

As can be observed in FIGS. 2 and 3, the filter cartridge 180 can be advantageously located internally of the engine compartment 115 vertically above a wheel well 240 of the motor vehicle 100, i.e. above a portion of the body 105 which exhibits a generally arched shape and which surmounts and covers one of the wheels of the motor vehicle 100, enabling however vertical movement thereof. In this position, the filter cartridge 180 occupies a very peripheral zone of the engine compartment 115, which is normally not much used and in which the filter cartridge 180 is quite well-protected, thus contemporaneously solving various constructional constraints relating to the shape and dimensions of the bonnet 135.

The plan volume of the filter cartridge 180 in the peripheral position such as the one described above can further be partially external with respect to the plan volume of the bonnet 135. For example, in the illustrated embodiment, the plan width of the bonnet 135 is slightly smaller than the width of the underlying engine compartment 115 (see the broken lines A and B denoted in FIG. 3 which represent the lateral ends respectively of the bonnet and the engine compartment 115). A niche of the engine compartment 115 is thus defined at the lateral flank 125, which niche is surmounted by a fixed portion of the body 105 and which is therefore substantially hidden even when the bonnet 135 is open. The filter cartridge 180 is partially housed in this niche, and is therefore not completely surmounted by the bonnet 135.

In the embodiment illustrated in figures from 1 to 3, the aspirating conduit 175 connects the aspirating manifold 160 directly with the mouth 210 of the filter cartridge 180, such that the filter elements 185 can be crossed from outside towards inside of the air to be filtered.

Figure 9:
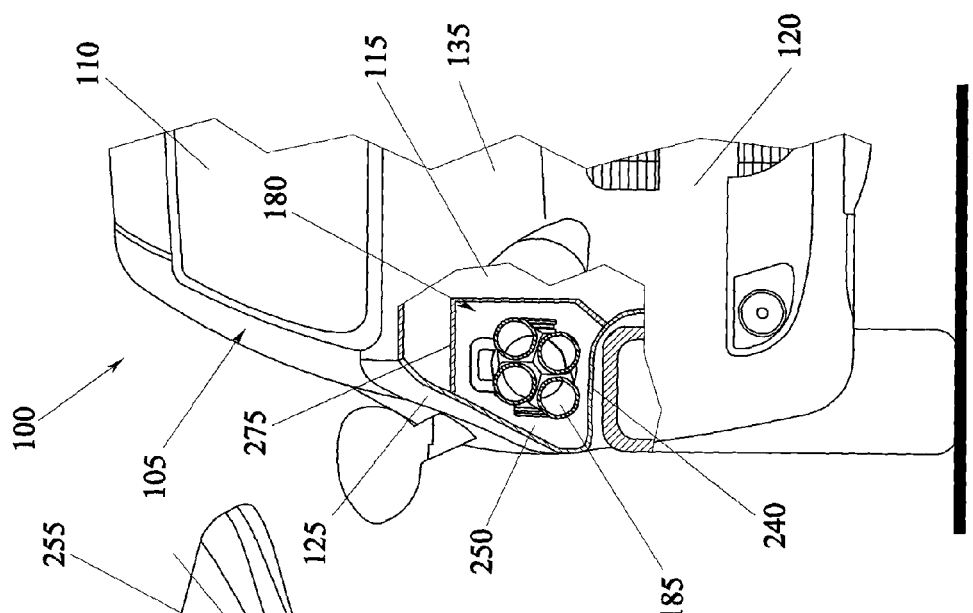
FIG. 9 is the view of FIG. 3 showing a second embodiment of the invention.

In this way, the filter cartridge 180 can be located internally of the engine compartment 115 freely, i.e. without any need to locate it internally of any type of closed casing, and can thus be directly engaged to a portion of the body 105, such as for example to the wheel well 240 and/or to the lateral flank 125, or in any case to any element directly associated to the portion of the body 105. In other embodiments, such as the one illustrated in FIG. 9, the filter cartridge 180 can however be housed internally of a closed casing 245, conventionally known as a filter box, which is contained internally of the engine compartment 115 where it can be fixe to a portion of the body 105, for example the wheel well 240 or the lateral flank 125. This casing 245 internally delimits a containing chamber 250 for the filter cartridge 180 and is provided with an inlet 255 for the air to be filtered, communicating with the environment external of the containing chamber 250, and an outlet for the filtered air 260, communicating with the aspirating manifold 160 of the engine 140 through the aspirating conduit 175.

Figure 10:
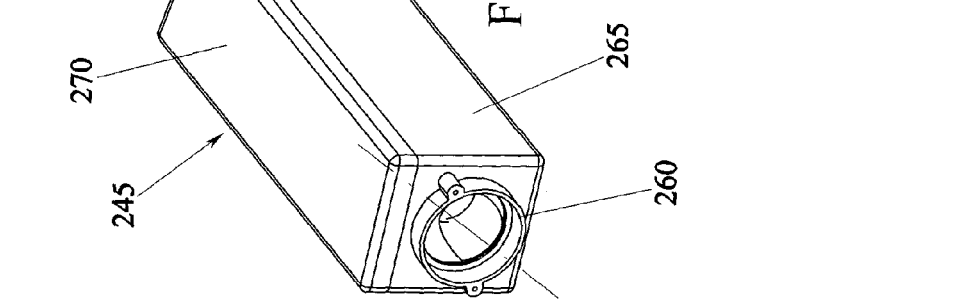
FIG. 10 is a perspective view of a casing for containing the filter cartridge in the embodiment of FIG. 9.

As illustrated in FIG. 10, the casing 245 can overall have a polyhedral shape, in the example an elongate polyhedron at ends of which the inlet 255 and the outlet 260 are fashioned. In particular, the casing 245 can comprise a lower body 265 made in a tray-shape, and an upper cover 270 able to close the tray. The upper cover 270 is fixed to the lower body 265 by reliable fastening means, in the example by means of a joint system, such that the upper lid 270 can be removed to make the containing chamber 250 accessible, for example in a case in which the filter cartridge 180 is to be replaced.

In this embodiment, the filter cartridge 180 can be engaged either to the inside of
casing 245 or such that the mouth 210 is connected the outlet 260, or such that the mouth 210 is connected with the inlet 255. In the first case, the filter elements 185 will be crossable from outside towards inside by the air to be filtered, exactly as in the embodiment which does not have a casing. In the second case, the filter elements 185 will be crossable from inside towards outside. In the last case, the casing 245 will have to be provided with appropriate seal means able to guarantee hermetic closure of the containing chamber 250 with respect to the engine compartment 115.

Figure 11:
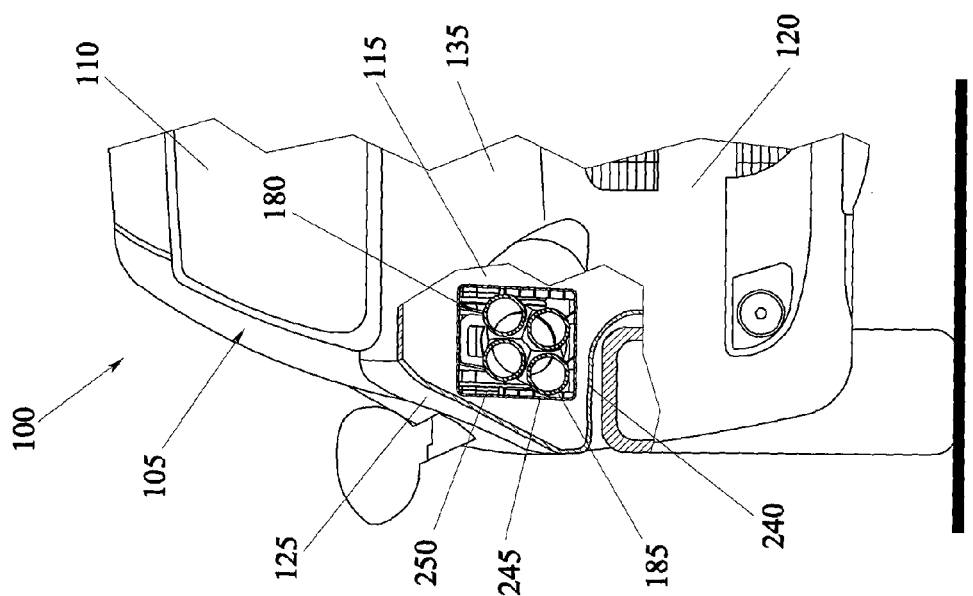
FIG. 11 is the view of FIG. 3 showing a third embodiment of the invention.

In other embodiments, such as the one illustrated in FIG. 11, some of the walls of the above-described casing 245 might be directly defined by one or more portions of the body 105 of the motor vehicle 100, for example by the lateral flank 125 and the wheel well 240, while the remaining walls might be defined by one or more casings 275 made of plastic or metal, which are fixed to the portions of the bodywork 105 in such a way as to delimit therewith the containing chamber 250.

In other embodiments (not illustrated) the containing chamber 250 might be fashioned directly completely internally of a portion of the bodywork 105, for example in the form of a seating made internally of the lateral flank 125 or of the wheel well 240, or in any case be made of an element directly associated to the bodywork 105, such as for example internally of a headlight installation, or another like solution.

Obviously numerous modifications or a technical-applicational nature can be made by a technical expert in the sector to the invention as described in the foregoing, without its forsaking the scope of the invention as claimed in the following.

The invention claimed is:

1. A vehicle (100) comprising a body (105), which body (105) comprises an engine compartment (115) in which an internal combustion engine (140) and a filter cartridge (180) are housed, an inlet mouth (210) of which filter cartridge (180) is provided with a flat flange (215) and is able to filter comburent air in aspiration to the internal combustion engine (140), in which the filter cartridge (180) is located in a position in which the plan volume of the filter cartridge (180) is completely external of the plan volume of the internal combustion engine (140), wherein the portion (125) of the body (105) which perimetrally delimits the engine compartment (115) comprises support means of the filter cartridge, and wherein the filter cartridge (180) is located vertically above a wheel well (240).

2. The vehicle (100) of claim 1, wherein the support means comprise a containing chamber (250) provided with an inlet (255) for the air to be filtered and an outlet (260) of the filtered air.

3. The vehicle (100) of claim 2, wherein the containing chamber (250) is at least partially defined by at least a portion (125, 240) of the body (105).

4. The vehicle (100) of claim 1, wherein the support means comprise a support body able to receive engaging means of the flat flange (215) which delimits the mouth (210) of the filter cartridge.

5. The vehicle (100) of claim 1, wherein the filter cartridge (180) comprises at least a filter wall (185) made of porous material and having a tubular shape.

6. The vehicle (100) of claim 1, wherein the filter cartridge (180) comprises a plurality of filter walls (185) made of porous material and having a tubular shape, which are configured such as to be crossed in parallel by the air to be filtered.

7. The vehicle (100) of claim 6, wherein each filter wall (185) is configured such as to be crossed radially from outside towards inside by the air to be filtered.

8. The vehicle (100) of claim 1, wherein the filter cartridge (180) is housed internally of a casing (245) which is smaller than and contained internally of the engine compartment (115) and which is provided with an inlet (255) for the air to be filtered and an outlet (260) of the filtered air.

9. The vehicle (100) of claim 8, wherein at least one of the walls of the casing (245) is a portion of the body (105).

10. The vehicle (100) of claim 1, wherein the filter cartridge (180) is vertically superimposed to the wheel well (240).

* * * * *